A. G. BARRETT.
Improvement in Wheels for Traction Engines.

No. 124,778. Patented March 19, 1872.

UNITED STATES PATENT OFFICE.

ALBERT G. BARRETT, OF BARRETT, KANSAS.

IMPROVEMENT IN WHEELS FOR TRACTION-ENGINES.

Specification forming part of Letters Patent No. 124,778, dated March 19, 1872.

Specification describing an Improved Wheel for Traction-Engines, invented by ALBERT G. BARRETT, of Barrett, in the county of Marshall and State of Kansas.

This invention consists in a wheel having spokes formed of steel springs, in pairs, the bend or junction of each pair fitting in a seat formed for its reception in a cast-iron hub, and the ends of said spokes being secured by pins or lugs to the rim or tread of the wheel.

Figure 1:
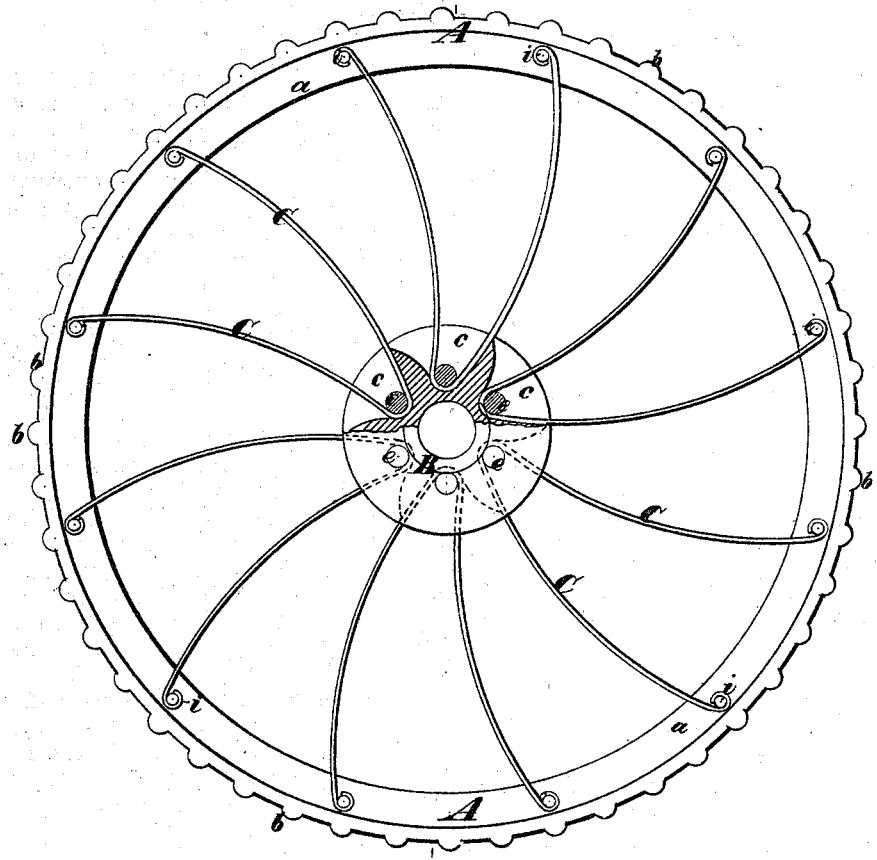
Figure 2:
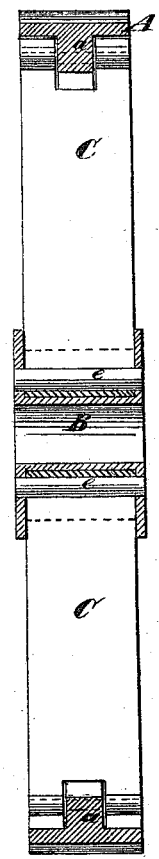

In the accompanying drawing, Figure 1 is a side view of a wheel made according to my invention, and Fig. 2 is a diametrical section of the same.

Similar letters of reference indicate corresponding parts in both figures.

The rim A of the wheel may be constructed in various ways; for instance, of wrought-iron, braced internally by a polygonal stay; or of steel, so as to be elastic; or of cast-iron with two internal ribs, one at each edge, which, in addition to stiffening it, will afford a convenient means for securing the ends of the spokes. In the example represented in the drawing, however, it is of cast-iron, and has but one rib, a. This is in the middle of the interior of the rim, and extends entirely around it. The periphery of the tread or rim A has a series of semicircular ribs, b b, formed transversely on it for improving the hold of the wheel on the ground; but for these there may be substituted a series of projections of any form. The hub B is of cast-iron, and has formed in its periphery a series of cavities, c c, corresponding in number with half the number of spokes for pairs of which they form seats. C C are the spokes. They are made in pairs, from spring-steel, of a width similar to the width of the rim A. Each strip is bent near the middle to form two spokes, the junction of which fits within one of the seats c c in the hub B, and is there secured by a pin, e, passing through the hub between the spokes constituting the pair, and the outer ends of the spokes are forked or divaricated to straddle the rib on the rim A. These ends are bent over to form loops or eyes which receive pins i i, passing transversely through the rib a.

In the wheel thus constructed, the strain brought to bear on it is supported by the spokes on the upper part of the wheel, as well as by those on the lower, and it is, to some extent, supported by all the spokes, it being imparted to all those in the upper half of the wheel as a tensile strain. To increase their elasticity, the spokes may have one or more curves formed in them. By means of the elasticity of the spokes, the hub of the wheel is permitted to rotate slightly in advance of the rim. This is of great use in starting, or when interrupted by some obstacle, as power may be stored up in the spring-spokes to overcome the difficulty; also, by means of their elasticity, they modify the effect of shocks occasioned by uneven ground to the machinery operating the wheels. Also, by means of the elasticity of its spokes, the wheel will take up all the thrust of the axle and obviate the sharp concussion produced on ordinary rigid wheels.

Claim.

The combination of the rim or tread A, the hub B, and the spokes C C, made in pairs, fitted to the hub, and attached to the rim, substantially as and for the purpose herein set forth.

ALBERT G. BARRETT.

Witnesses:
A. G. ALLEN,
ELIZABETH B. MOFFITT.